April 20, 1965     E. BUYER     3,179,934
THREE DIMENSIONAL RADAR DISPLAY
Filed Nov. 6, 1961     4 Sheets-Sheet 1

*INVENTOR.*
EDWARD BUYER
BY Moses, Nolte & Nolte
ATTORNEYS

INVENTOR.
EDWARD BUYER

April 20, 1965 E. BUYER 3,179,934
THREE DIMENSIONAL RADAR DISPLAY
Filed Nov. 6, 1961 4 Sheets-Sheet 4

INVENTOR.
EDWARD BUYER
BY Moses, Nolte & Nolte
ATTORNEYS

3,179,934
THREE DIMENSIONAL RADAR DISPLAY
Edward Buyer, Ramsey, N.J., assignor to Maxson Electronics Corporation, New York, N.Y., a corporation of New York
Filed Nov. 6, 1961, Ser. No. 150,287
17 Claims. (Cl. 343—7.9)

This invention relates to display of radar target information and particularly to a system permitting display of height information, together with the normal range and bearing information on a standard radar plan position indicator tube.

In the past it has been difficult to obtain and coordinate information concerning the three-dimensional position of an object such as an aeroplane, in space. Altitude information generally is obtained and maintained separately from bearing and range information, without provision for combining the data in a common coordinated display. It is therefore the primary object of this invention to provide a novel system for displaying a three-dimensional position of an object in space, in a single combined presentation.

The present invention accepts the altitude information supplied by a height-finding radar and adds this to the normal range and bearing indications on a standard PPI radar tube. By controlling the sweep of the cathode ray tube, the inner four-fifths of the face of the tube may be used for the range and bearing display, while the outer one-fifth can separately display height information. The first portion of the sweep is coordinated with the selected altitude sector of the second portion, to show only the targets also shown by the second portion. The height information is stored in a storage tube during the first portion of the sweep and then switched onto the second tube portion when the predetermined display switching point is reached. The invention will be more fully understood and other objects and advantages will become apparent in the following description and accompanying drawings, in which:

Figure 1:
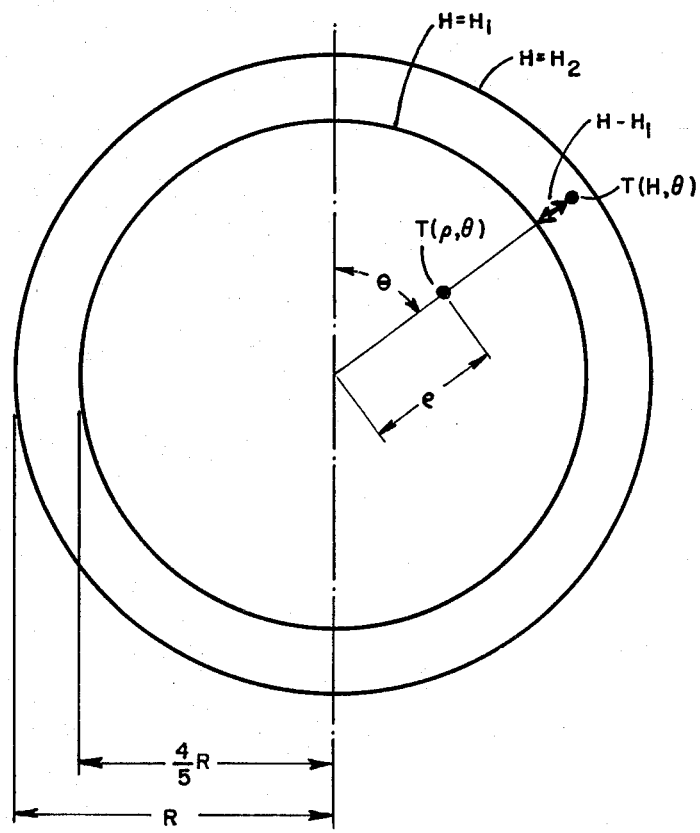
FIG. 1 is a view of the radar display tube face showing target range, bearing and altitude information.

As shown in FIG. 1, a target T is located at a bearing angle $\theta$, and range $\rho$, from a center reference point and line, within a first inner four-fifths of the total R deflection R or sweep across the tube face. A second outer ring portion between $\frac{4}{5}R$ and R completes the display and indicates the height (H) of the target T, within an altitude sector between rings $H_1$ and $H_2$.

Figure 2:
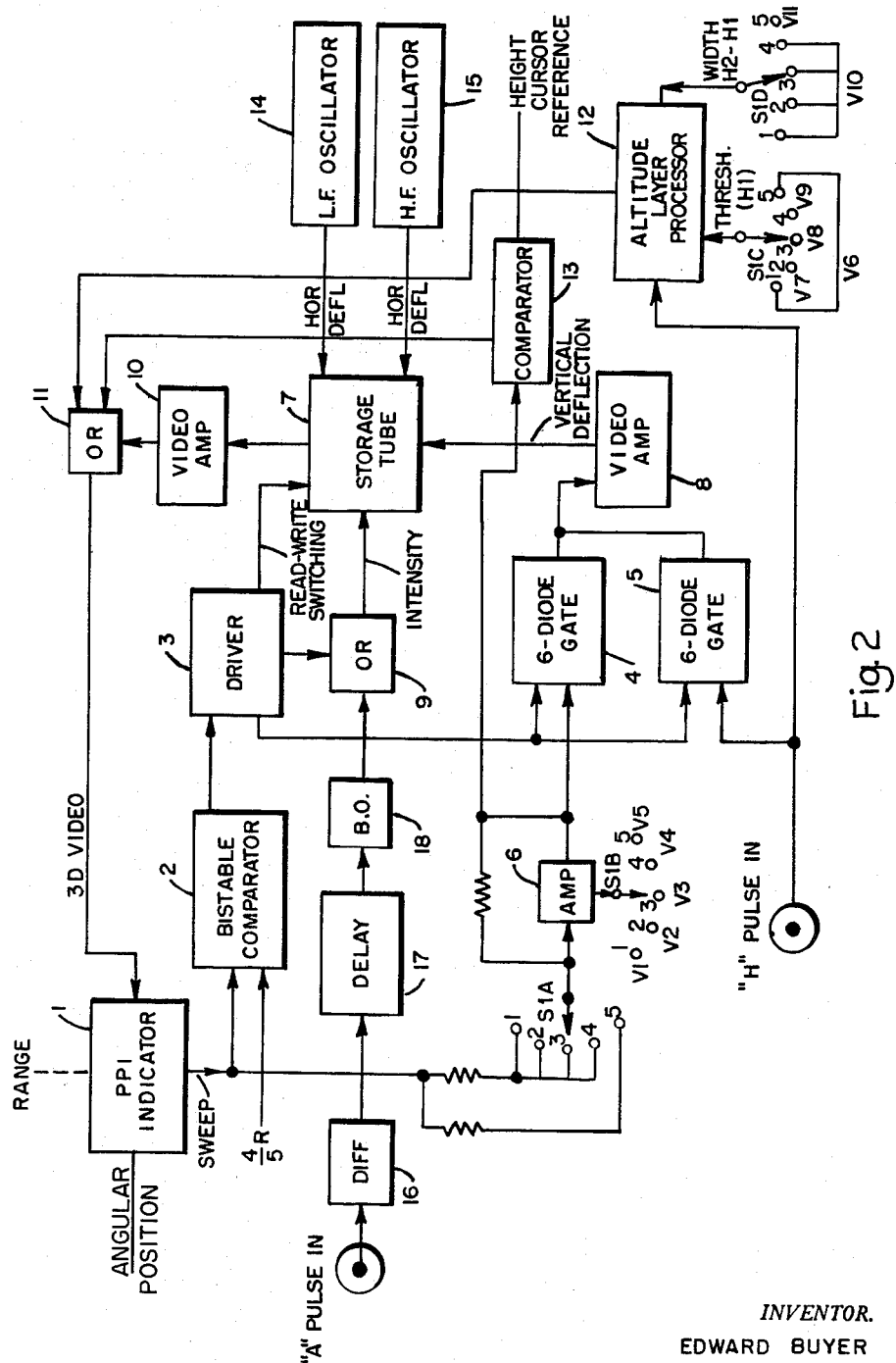
FIG. 2 is a block diagram of the system used to achieve the novel display.

FIG. 2 shows a height analog pulse "H," which is derived from a separate height-finding radar system, such as described in prior application Serial No. 373,117, filed on February 24, 1964, and entitled "A Three Dimensional Radar System," and assigned to the instant assignee, and inserted into an altitude layer processor 12. The output pulse of this unit is shown as waveform H in FIG. 3. The altitude layer processor 12 generates an output pulse only when its input lies between the selected threshold and threshold plus width display area. Threshold and width reference voltages V6–V10 are fed to the altitude layer processor through switch sections SIC and SID. Since the altitude layer processor output is only generated when an echo is received from a target, the output pulse is displayed on the inner portion of the tube. Thus, the output pulse feeds through OR gate 11 to the video input of a standard PPI indicator 1 and paints the inner portion ($\rho, \theta$) of the three-dimensional display. The purpose of the altitude layer processor is to inhibit the display of targets outside of a predetermined height range. In effect, it permits the display of targets only when the reflected pulse from those targets has an amplitude within a predetermined range of magnitudes corresponding to the desired height range. As such, the altitude layer processor acts as a pulse discriminator which generates an immediate output pulse when the amplitude of the input pulse lies between preselected limits.

Sweep is taken from the PPI indicator 1, and applied to a bi-stable comparator 2, which switches when its input reaches the level corresponding to $\frac{4}{5}$ deflection on the display tube. One such suitable comparator is the cathode coupled multivibrator shown in "Pulse and Digital Circuits" by Millman and Taub, pages 475–476. If the PPI indicator utilizes sweep speed or range adjustment after coordinate resolution, an indicator modification may be utilized. This may comprise a potentiometer ganged to the range shaft to attenuate the unresolved sweep. The potentiometer wiper then furnishes the required input for comparator 2.

Figure 3:
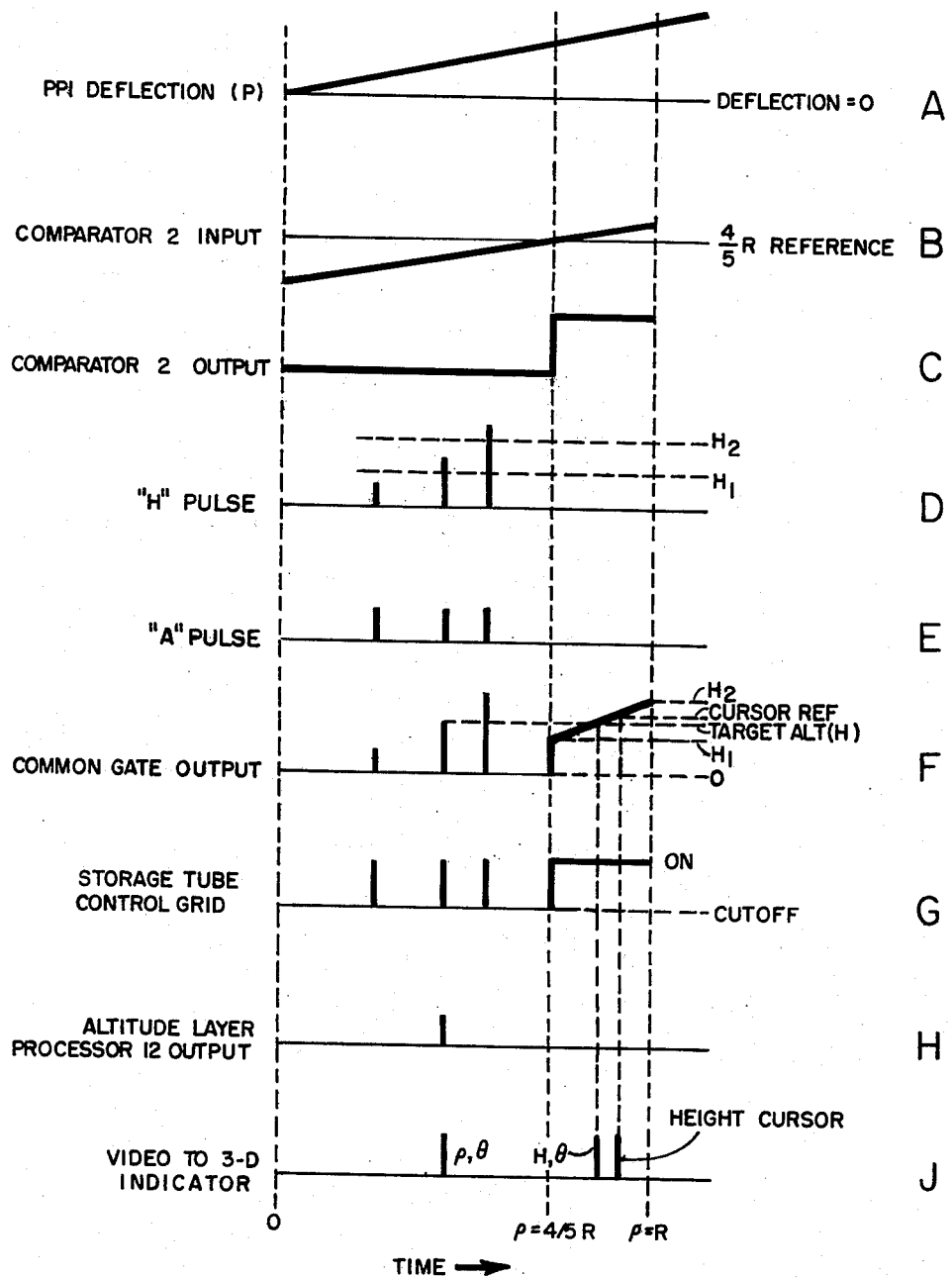
FIG. 3 is a diagram showing pulses and wave forms at various portions of the system.

Waveforms A, B and C of FIG. 3 represent PPI deflection, and comparator input and output respectively. The output of the bi-stable comparator is passed through push-pull driver 3 which supplies positive and negative pulses to 6-diode gates 4 and 5. A more complete description of these gates may be found in the same above-mentioned text, pages 445–447. The driver output switches diode gate 4 from OFF to ON and diode gate 5 from ON to OFF at $\frac{4}{5}R$.

The other input to gate 4 is a level-shifted indicator sweep. This sweep is provided by differential feedback amplifier 6 to which are fed the indicator sweep and selectable D.C. references V1–V5 from switch SIB. The D.C. reference shifts the sweep level so that the amplifier output reaches a voltage corresponding to $H_1$ the lower height, when $\rho=\frac{4}{5}R$. For example, if $H_1$ equals 20,000 feet, $H_2=30,000$ feet, and the H pulse scale factor is .1 volt per 1,000 feet, the level shift and sweep scale factor would be required to produce an amplifier output of 2 volts at $\rho=\frac{4}{5}R$, and an output of 3 volts at $\rho=R$. If $H_1=30,000$ feet and $H_2=40,000$ feet, the scale factor remains unchanged, but an additional level shift of 1 volt is required.

The indicator sweep speed is adjusted so that the useful end of the radar return period occurs at $\frac{4}{5}R$. If the indicator is calibrated in range, it will be necessary to make the necessary internal adjustments to slow down the indicator sweep so that the range dial actually reads full range at $\rho=\frac{4}{5}R$.

In one form of the device, four height scales 1–4, are utilized, each representing increments of 10,000 feet and a fifth scale 5 represents the full range from 0 to 40,000 feet. A change in scale factor is required only on scale 5. As shown in FIG. 2, this is done by switching the input resistor of amplifier 6 on step 5 of switch S1A. In the altitude layer processor 12 the threshold levels are identical at positions 1 and 5 of switch S1C and width levels identical for positions 1–4 of switch S1D. Switch sections S1C and S1D track the altitude layer processor reference voltage to the three-dimensional control settings which are on switches S1A and S1B. When it is desired to monitor all of the ranges simultaneously, duplicate sets of equipment may be utilized. Since the altitude layer processor is part of an external height-finding radar equipment, it is not discussed in further detail herein.

Figure 4:
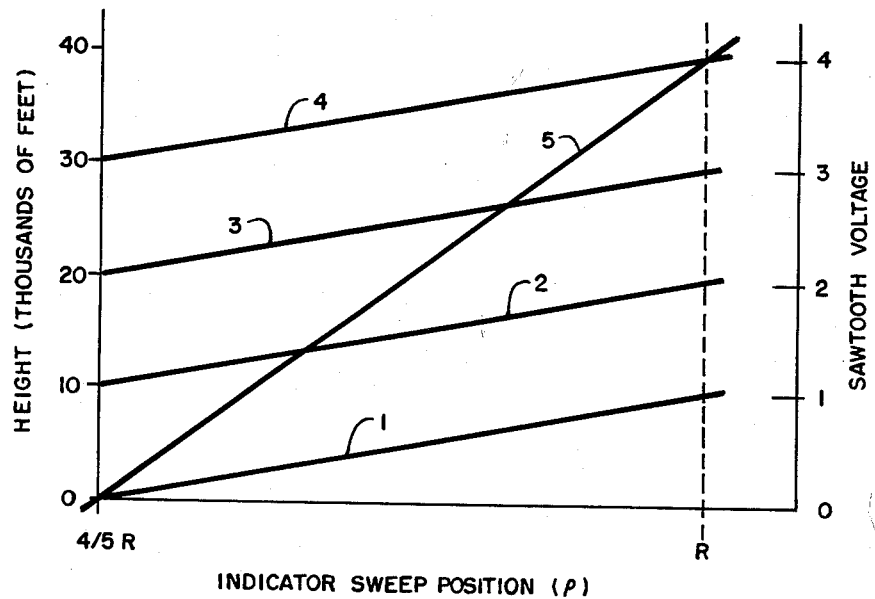
FIG. 4 is a diagram showing sawtooth altitude pickoff waveforms for the several altitude scales.

FIG. 4 shows the output waveform for the above 5 scales. Here only the portion of the sawtooth sweep between $\frac{4}{5}R$ and R is plotted, the remainder of the waveform being immaterial for the altitude display.

The common output of gates 4 and 5, shown as waveform F of FIG. 3, is amplified in the video amplifier 8 and applied to the vertical deflection plates of a barrier grid storage tube 7 of a type known as a Radechon, such as manufactured by the Radio Corporation of America. This tube is similar to a cathode ray tube in appearance and construction, except that the phosphor screen is replaced by a storage screen assembly. Instead of producing visible light at a position determined by the applied voltages to the horizontal and vertical deflection plates, a charge is stored at this position. The charge is proportional to the instantaneous beam intensity and is hence determined by the control grid potential.

By changing the potential of the storage screen, the tube operation changes from "write" to "read." During "read" the storage screen is scanned by a constant intensity beam. When a spot which has been charged during the "write" process is scanned, an output proportional to the charge density is generated and the charge is "erased." A further detailed description of the storage tube and associated circuitry may be found in "Radechon Storage Tube Circuits" by Jensen and Gray, RCA Review, vol. 16, 1955, p. 234–241.

During the range sweep, driver 3 applies "write" voltage to the storage screen. The electron beam is pulsed ON only while an "A" trigger pulse is present. The "A" pulse is generated by sample switch blocking oscillators, which are part of the external height-finding radar, concurrently with "H," the height analog pulse, as illustrated by waveforms D and E of FIG. 3. For purposes of explanation, three separate H pulses are illustrated in waveform D. These pulses are each indicative of a reflected pulse from three different targets at three different heights represented by the respective pulse magnitudes. These pulses may be produced in any desired manner and in the present case are produced by the apparatus of application No. 373,117 wherein the reflected target pulses are converted to output pulses the amplitudes of which are proportional to the heights of the respective targets. Thus, the time of occurrence of each of the H pulses is indicative of the range of a target while the magnitude of that pulse is indicative of the height of the target.

The A pulse is passed through a differentiator circuit 16 to select its leading edge and then through delay circuit 17 to develop a signal to intensify a portion of the flat top of the height analog pulse. Blocking oscillator 18 amplifies and determines the duration of the intensifier pulse. The net effect is to "write" a spot on the storage screen at a vertical position proportional to the aircraft altitude. Since the same amplifier is used to deflect both the height pulse and the sawtooth "read" sweep, equal height and sawtooth voltages will result in identical beam positions, while aiding the cancellation of amplifier drift and distortion.

When the sweep reaches the ⅖R point, driver 3 switches storage tube 7 to "read" and increases the storage tube control grid voltage by applying a step through OR gate 9 to bring the beam ON, as shown by waveform G in FIG. 3.

The sawtooth sweep is then applied to the vertical deflection plates. When the beam encounters a stored target, a pulse is fed through video amplifier 10 via OR gate 11 to the PPI indicator 1. The "read" operation automatically erases all stored targets. On flyback or return, the three-dimensional processor automatically reverts to "write" as the deflection voltage passes through the ⅖R level.

A comparator 13 generates a height cursor or altitude reference line when the sawtooth from amplifier 6 reaches a preset height. For example, a height reference of 2.5 volts yields a 25,000 foot height circle cursor. A suitable comparator may be found in the previously mentioned "Pulse and Digital Circuits," pages 468–473, referred to as the Multiar. The output pulse of comparator 13 feeds the indicator 1 through OR gate 11. The composite video drive to the three-dimensional display indicator is shown as waveform J of FIG. 3. The output of the altitude layer processor 12 is in real time. In other words, it is coincident with the radar return and therefore is displayed on the inner portion of the PPI indicator. Since it is a real time processor, it generates constant amplitude output pulses whenever the input pulse amplitude is between preselected limits. A differential pulse height analyzer, an instrument in wide usage in nuclear physics, is suitable for use as the altitude layer processor.

The fundamental distinction between the three dimensional radar of the present system and the prior art is that the magnitude of a pulse H is indicative of the altitude of the corresponding target rather than the signal strength. Because the three dimensional radar is a real time device, the output is indicative of range and azimuth as well as height.

Since the operation of the storage tube in the single vertical trace mode described may damage the storage screen, a low frequency wobulation is employed. Low frequency oscillator 14 slowly moves the vertical trace over the storage screen by driving the horizontal deflection plates. The wobulation must be slow enough so that the sawtooth height pick-off sweep is displaced from the preceding height storage by substantially less than a beam spot diameter to provide sufficient resolution.

High frequency oscillator 15 prevents horizontal deflection noise, such as electrostatic and magnetic field pickup, from causing the "read" sweep to misregister with the preceding "write." Oscillator 15 applies a small high frequency horizontal perturbation of approximately several spot diameters and about 10 megacycles, creating the effect of an elliptical scanning spot, assuring that the "read" sweep contacts the stored targets in spite of random low-level horizontal deflection. Pass-band limitations in subsequent circuitry remove the 10 megacycles component from the signal.

The present invention thus provides a novel display of the three-dimensional position of an object in space. While only a single embodiment has been illustrated, it is apparent that the invention is not limited to the exact form or use shown, and that many variations may be made in the particular design and configuration without departing from the scope of the invention as set forth in the appended claims.

What is claimed is:

1. A radar target display system comprising an indicator tube having a radial sweep, said sweep having a first portion and a second portion, first input means supplying a first signal pulse during said first sweep portion to indicate the range position of said target, a second input means supplying a second signal pulse during said second sweep portion to indicate the altitude position of said target, means controlling said first and second signal pulses to display targets within a preselected altitude sector on said indicator tube, and storage means to store said second signal pulse during the first portion of said sweep and to apply said second signal pulse to said indicator tube during said second sweep portion.

2. A radar target display system according to claim 1, wherein said storage means comprises a storage tube and means for triggering said storage tube on during said second sweep portion.

3. A three dimensional display system according to claim 2 including means for selecting said altitude sector within predetermined limits.

4. A three dimensional display system according to claim 2 including means automatically varying the position of the trace on said storage tube.

5. A three dimensional display system according to claim 3 including means for generating an altitude reference line at a preset altitude.

6. A display means for three dimensional radar, comprising a cathode ray tube, means for displaying range and azimuth information of one or more targets by corresponding spots on an inner portion of said tube, said inner portion having a fixed periphery, and means for displaying the height of said targets on an outer portion of said display the radial distance of a spot on said inner portion from the center of the cathode ray tube being indicative of range, and the radial distance of a spot from said fixed periphery on said outer portion being indicative of height.

7. A display means according to claim 6, wherein said height of a target is indicated by a spot on the outer portion at the same bearing angle as the spot produced by that target on the inner portion, the height of said target being indicated by the distance of said outer spot from the periphery of said inner portion.

8. For use with a height surveillance system wherein height information is represented by an analog pulse, a three-dimensional display for simultaneously indicating the range, azimuth and height of one or more targets, comprising a display tube, means for sweeping said display tube whereby the range and azimuth of a target is displayed during a first portion of the sweep, storage means for storing a representation of the amplitude of said pulse during said first sweep portion, and means for transferring said stored representation to said display tube during a second portion of the sweep, wherein the position of a first spot on the display tube indicates the range and azimuth of a target, and the position of a second spot indicates the height thereof.

9. A three-dimensional display according to claim 8, wherein said display tube is a plan position indicator, and said sweep means sweeps said indicator radially.

10. A three-dimensional display according to claim 9, including a reference sweep voltage, and comparison means responsive to said reference sweep voltage and the sweep voltage on said display tube for controlling the translation of information to and from said storage means, whereby relative height information is indicated by the distance of said second spot from a fixed circumference on the display tube determined by said reference sweep voltage.

11. A three-dimensional display according to claim 10, wherein there is further provided means for inhibiting the display of targets outside of a predetermined height range.

12. A three-dimensional display according to claim 11, wherein said inhibiting means includes means for preventing the application of range information to said indicator when the amplitude of said analog pulse is outside of a predetermined range.

13. A three-dimensional display according to claim 12, wherein said storage means includes a storage tube adapted to read out information stored therein in response to predetermined deflection voltages, and means for varying said deflection voltages according to the height range which it is desired to display.

14. A three-dimensional display according to claim 10, wherein said storage means includes a storage tube adapted to store a charge on the screen thereof at a position determined by the voltages applied to its deflection plates, and adapted to read out said charge by scanning said screen with a constant intensity beam, whereby an output is generated when said spot is scanned.

15. A three-dimensional radar display for simultaneously indicating the range, height and azimuth of one or more targets, comprising a display tube, means for producing a first dot on the face of said tube having a position indicative of the range and azimuth of a target and means for producing a second dot on said tube indicative of the azimuth and height of said target.

16. For use with a plan position indicator adapted to provide a display of the range and azimuth of one or more targets, apparatus enabling said indicator to display the relative height of said targets substantially simultaneously with the relative range and azimuth thereof, said apparatus comprising means operative during a select portion of the sweep of said plan position indicator for storing an indication of the height of a target, and means operative during a second portion of said sweep for transferring the information stored in said storage means to said plan position indicator.

17. For use with a plan position indicator adapted to indicate the range and azimuth of at least one target, a height indicating attachment including means adapted to receive a pulse having an amplitude indicative of the height of the target to be displayed, means for storing an indication of said pulse height while the range and azimuth information is displayed, and means for transferring said stored representation to said indicator after said range and azimuth information is displayed whereby a second spot is displayed on said indicator indicative of the azimuth and height of said target.

References Cited by the Examiner
UNITED STATES PATENTS

| | | | |
|---|---|---|---|
| 2,535,274 | 12/50 | Dicke | 343—7.7 X |
| 2,632,158 | 3/53 | Wallace | 343—7.9 |
| 2,648,061 | 8/53 | Parker et al. | 343—7.9 |
| 2,824,302 | 2/58 | Poor | 343—7.9 X |
| 2,866,191 | 12/58 | McFall et al. | 343—7.9 |
| 2,983,916 | 5/61 | Iams | 343—7.9 X |

CHESTER L. JUSTUS, *Primary Examiner.*